United States Patent [19]
Keib et al.

[11] 3,945,814
[45] Mar. 23, 1976

[54] APPARATUS FOR FEEDING PARTICLES OF GLASS INTO CRUCIBLES FOR EXTRUSION OF GLASS FILAMENTS

[75] Inventors: Heinz Keib; Dieter Kahnke, both of Wertheim, Main, Germany

[73] Assignee: Glaswerk Schuller GmbH, Wertheim, Main, Germany

[22] Filed: May 28, 1974

[21] Appl. No.: 473,897

[30] Foreign Application Priority Data
May 26, 1973 Germany............................ 2326975

[52] U.S. Cl.................... 65/11 R; 65/11 W; 65/29; 65/335; 177/119; 222/77
[51] Int. Cl.²..................... C03B 37/02; C03B 3/00
[58] Field of Search........ 222/77; 177/1, 119; 65/2, 65/11 R, 11 W, 335, 27, 29, 161

[56] References Cited
UNITED STATES PATENTS

| | | | |
|---|---|---|---|
| 3,049,754 | 8/1962 | Frickert........................... | 65/335 X |
| 3,244,494 | 4/1966 | Apple et al...................... | 65/335 X |
| 3,247,554 | 4/1966 | Hanks et al...................... | 65/335 X |
| 3,348,936 | 10/1967 | Clark et al...................... | 65/161 X |
| 3,695,371 | 10/1972 | Sheetz............................. | 222/77 X |
| 3,730,695 | 5/1973 | Varrasso......................... | 65/2 |

*Primary Examiner*—Robert L. Lindsay, Jr.
*Attorney, Agent, or Firm*—Michael J. Striker

[57] ABSTRACT

Glass tablets which are to be introduced seriatim into an elongated melting chamber of a crucible having orifices for extrusion of glass filaments are stored in a magazine and are fed onto the first section of a first vibrating trough whose sections have different inclinations. The last section of the first trough discharges tablets into the receptacle of a weighing device which accumulates a predetermined number of tablets and thereupon discharges the accumulated batch of tablets onto the first section of a second vibrating trough the last section of which discharges tablets into an elongated hopper registering with the open top of the melting chamber. At least the last section of the second trough is inclined downwardly toward the hopper to such an extent that tablets leaving the preceding section of the second trough are accelerated during travel in the last section and enter the hopper at timely spaced intervals. The second trough is caused to swivel back and forth so that its last section discharges tablets into different portions of the hopper.

6 Claims, 4 Drawing Figures

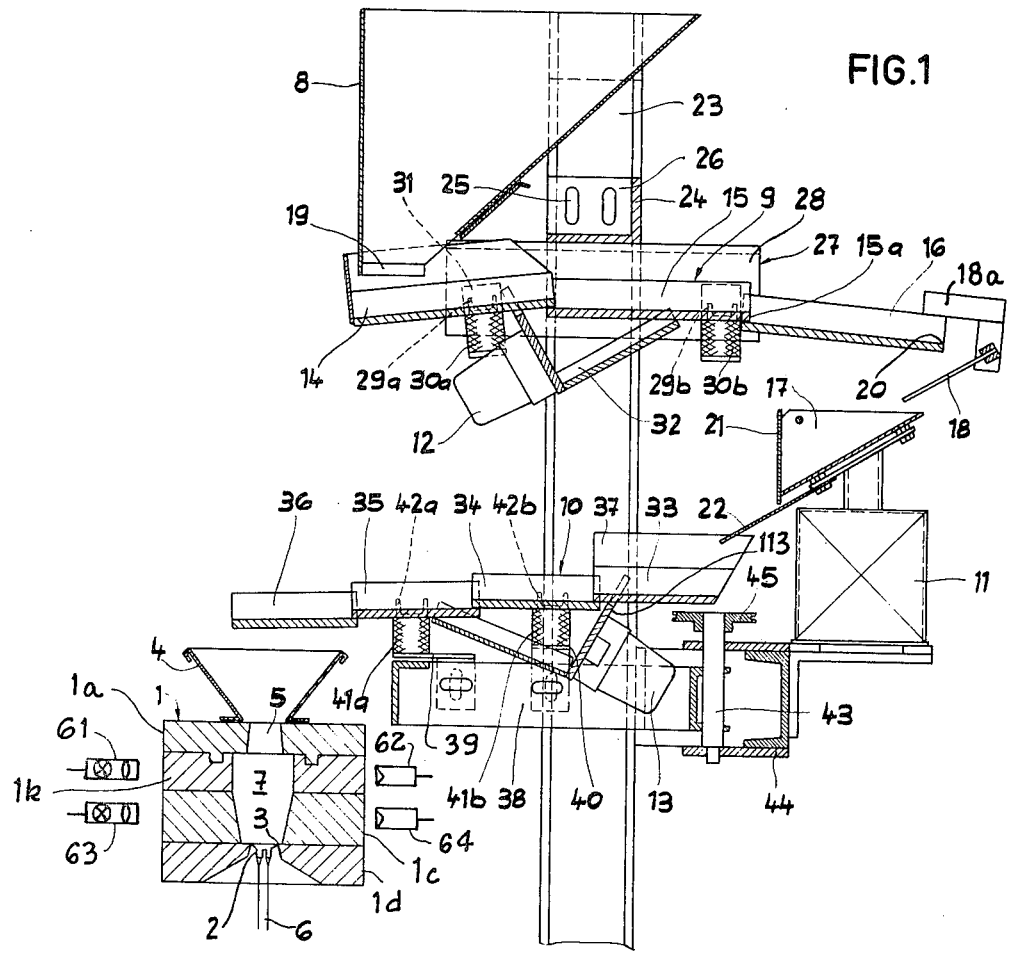
FIG.1
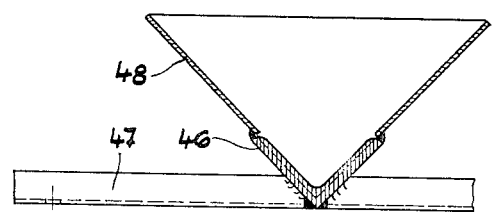
FIG.3
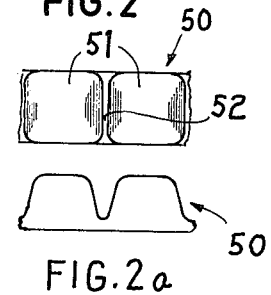
FIG.2
FIG.2a

APPARATUS FOR FEEDING PARTICLES OF GLASS INTO CRUCIBLES FOR EXTRUSION OF GLASS FILAMENTS

BACKGROUND OF THE INVENTION

The present invention relates to a method and apparatus for feeding particulate material into a melting chamber, and more particularly to a method and apparatus for feeding particles of glass into a crucible or muffle wherein the particles are heated to or above melting temperature and from which molten material is extruded in the form of filaments. Still more particularly, the invention relates to improvements in a method and apparatus for continuous simultaneous extrusion of a plurality of glass filaments by resorting to an elongated crucible with one or more rows of extrusion nozzles.

Apparatus for the making of glass filaments normally employ a crucible or muffle defining a melting chamber for a charge of molten glass and having one or more orifices serving to discharge streamlets of molten glass which harden immediately or shortly after they leave the orifices of the nozzles to be thereby converted into elongated filaments which are thereupon collected, grouped and/or otherwise manipulated, depending on their intended use. The crucible consists of a highly heat-resistant metallic, refractory or other substance, and its chamber must receive fresh material (glass in solid state) in order to insure that the upper surface of the molten charge in its chamber does not descend below a minimum permissible level. The nozzles for extrusion of filaments normally form part of a spinneret which is installed in the crucible to constitute the bottom wall or base plate of the melting chamber. The spinneret may be formed with one or more rows of nozzles, and the filaments issuing from the orifices of such nozzles are engaged and convoluted by a rapidly moving rotary body, such as a drum, roller, spool or the like. The rotary body also serves as a means for attenuating the filaments to a desired thickness. In the manufacture of filaments of finite length, the filaments are caused to contact the periphery of a rotary drum whereon they remain parallel to each other and are convoluted on the periphery of the drum to form a hollow cylindrical layer of desired thickness (glass wool). If the apparatus is used for the making of relatively short staple fibers, the drum cooperates with a stripper or doctor blade which severs the filaments before they can form complete convolutions around the periphery of the drum. It is also known to assemble the filaments which issue from the nozzles of the spinneret into two or more tows or multi-filament yarns which are thereupon convoluted onto bobbins or spools to form threads known as glass silk.

For the making of glass wool or staple fibers, the apparatus of presently known design normally employ a relatively large drum having a diameter of up to or in excess of 1,000 millimeters and an axial length which equals or closely approximates its diameter. Such large drum cooperates with a crucible having a spinneret whose length equals or approximates the axial length of the drum and which is formed with one or more rows of nozzles whereby each row comprises a substantial number of discrete nozzles. Thus, the length of the melting chamber in the crucible can reach or even exceeds 1 meter. This presents serious problems as concerns the homogeneousness of molten charge in the crucible. A satisfactory consistency of molten charge can be insured only if the volume or mass of molten charge is rather small, i.e., if the elongated chamber is relatively narrow and the height of molten charge therein is rather small. Otherwise, the heating means in or for the crucible cannot guarantee a satisfactory heating of each and every region of the molten charge so that, once the mass of such charge exceeds a relatively small maximum permissible value, it develops streaks not only in the region of its upper surface but also in its interior to thus affect the quality of filaments which issue from the nozzles of the relatively long spinneret. Additional problems arise due to the fact that the crucible must receive fresh material at the rate at which molten material is being extruded through the nozzles, i.e., freshly admitted particles of glass must melt and blend into the previously molten material at the rate at which the charge is being depleted when the apparatus is in use. As a rule, fresh material is fed into the melting chamber by gravity so that it dips into and is submerged in the charge to thereby melt and replenish the contents of the crucible.

An essential requisite for the extrusion of continuous glass filaments is that the viscosity of molten charge in the region just above the nozzles of the spinneret remain constant. Thus, the charge above the spinneret must be refined or homogenized to a very high degree so as to be free of streaks, air bubbles or the like. This cannot be readily achieved in view of the desirability of a relatively small melting chamber, i.e., a melting chamber which does not contain a large quantity of molten material. Were the melting chamber designed to receive a relatively large quantity of molten glass (this is not desirable on the aforementioned ground that the heating means cannot maintain all zones of a large charge at a given temperature), the quantity of admitted particulate material relative to the quantity of molten material would be rather small so that the viscosity of molten charge would change very little or not at all, especially if the particulate material (solid glass particles) were admitted into the crucible at a substantially constant rate. Consequently, the quality of filaments and the condition of molten glass in a crucible having a relatively small melting chamber depends to a very large extent on the rate at which fresh material is being fed into the crucible.

Many presently known apparatus for the making of glass filaments use glass particles in the form of pellets, i.e., particles of spherical or substantially spherical shape. A drawback of such apparatus is that the manufacture of glass pellets is an expensive procedure which contributes significantly to the cost of the ultimate produce. Therefore, the manufacturers of glass filaments prefer to employ particles of other than spherical shape, especially particles in the form of small tablets or groups of tablets resembling portions of chocolate bars. Such tablets can be produced with a reasonably high degree of uniformity, i.e., their weight or mass deviates rather negligibly from a preselected value so that, by feeding such tablets into the crucible at a substantially constant rate, one can insure that the upper surface of molten charge in the chamber of the crucible will fluctuate only within a permissible range. However, the particles in the form of tablets or cakes exhibit the drawback that they are normally obtained by breaking up a relatively large bar or plate into a large number of similarly configured fragments whereby portions of such fragments exhibit ragged edges, recesses, protuberances and/or other unevennesses which interfere with uniform feeding of tablets into the melting chamber.

The feeding of spherical and/or tablet-shaped glass particles into relatively small crucibles, and especially into relatively small crucibles having round melting chambers (such crucibles are often used in the making of glass silk) presents no serious problems because the particles can be caused to enter the charge at the center of the melting chamber. Such central feeding does not affect the uniformity of viscosity of the charge in the region of the nozzles. However, the situation is aggravated when the crucible has a long melting chamber because the admission of particles into one and the same region will invariably cause pronounced changes in viscosity, especially since the capacity of the crucible is relatively small. It was already proposed to employ in such apparatus a feeding device with several adjacent chutes for admission of glass particles into different portions of an elongated melting chamber. The particles are fed by gravity, for example, in a manner as disclosed in German Pat. No. 1,596,667. It has been found that such apparatus operate properly only if the particles resemble or constitute spheres. It has also been found that heat which is being radiated by the crucible and the charge therein melts the particles at the discharge ends of discrete chutes so that the particles soften and adhere to their chutes and block the progress of the next-following particles. Such softening of particles and their adherence to the chutes is observable even if the particles are perfect spheres. Removal of softened particles from the chutes is a time-consuming operation, especially since the attendants must be shielded from heat.

SUMMARY OF THE INVENTION

An object of the invention is to provide a novel and improved method and apparatus for making glass filaments.

Another object of the invention is to provide a novel and improved method of supplying solid glass particles into an elongated melting chamber of a crucible in an apparatus for continuous extrusion of glass filaments.

A further object of the invention is to provide a method which insures uniform distribution of non-spherical glass particles in an elongated chamber for a charge of molten glass which is being converted into filaments.

An additional object of the invention is to provide a method of converting a stream of closely adjacent glass particles into a single file of discrete spaced-apart particles.

Still another object of the invention is to provide an apparatus which can convert a stream of randomly distributed non-spherical glass particles into a single file of spaced-apart particles before the particles are allowed to enter an elongated melting chamber in a crucible which serves for extrusion of one or more rows of glass filaments.

A further object of the invention is to provide the apparatus with novel and improved means for transporting glass particles from a magazine to a hopper which discharges particles into different zones of the melting chamber in a crucible.

Another object of the invention is to provide an apparatus wherein non-spherical glass particles can be fed into a crucible at a rate which is more uniform than, or at least as uniform as, the rate of feed of spherical particles in heretofore known apparatus.

One feature of the invention resides in the provision of a method of feeding substantially identical particles of glass into the elongated melting chamber of a crucible which stores a charge of molten glass and has orifices for continuous extrusion of filaments. The method comprises the steps of establishing and maintaining a supply of particles (e.g., in a magazine or in a weighing device), conveying a stream of particles from the supply toward the melting chamber along an elongated path, and accelerating the particles of the stream — at least in that region of the path which is located immediately upstream of the melting chamber — to thereby attenuate the stream so that the particles enter the crucible by gravity at timely spaced intervals.

The method prefereably further comprises the steps of moving the aforementioned region of the path lengthwise of the melting chamber so that successive particles enter different portions of the charge in the crucible. The downstream region of the path is preferably moved back and forth at regular intervals.

The conveying step preferably comprises vibrating the particles of the stream, and the accelerating step may comprise transporting the particles from a higher level to a lower level, for example, along successive sections of a trough wherein such successive sections have different inclinations with respect to a horizontal plane.

The path may include a first elongated portion which receives particles (preferably in the form of tablets or groups of tablets) from the supply, and a second portion which includes the aforementioned region. The method then preferably further includes the steps of accumulating the particles which leave the first portion, weighing the accumulated particles, and introducing the accumulated particles into the second portion of the path when the combined weight of accumulated particles equals or closely approximates a predetermined value. The introducing step preferably takes place when the combined weight of accumulated particles matches the aforementioned predetermined value or exceeds such value by less than the weight of a single particle.

The method may further comprise the steps of monitoring the upper surface of the charge in the melting chamber, interrupting the conveying step when the surface of the charge rises to a first predetermined level, and resuming the conveying of particles when the surface of molten charge descends to a second predetermined level.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a smaller-scale partly elevational and partly vertical sectional view of an apparatus which embodies the invention;

FIG. 2 is a plan view of a glass particle;

FIG. 2a is a side elevational view of the particle shown in FIG. 2; and

FIG. 3 is an enlarged transverse vertical sectional view of one section of a composite trough in the apparatus of FIG. 1.

DESCRIPTION OF THE PREFERRED EMBODIMENTS

The apparatus of FIG. 1 comprises a melting pot or crucible 1 which is assembled of a stack of four blocks 1a, 1b, 1c, 1d held together by a metallic frame, not shown. Each block defines a portion or zone of a composite melting chamber wherein a charge of molten glass is maintained in response to admission of a succession of glass particles 50 (FIGS. 2 and 2a) by way of a funnel-shaped hopper 4. The opening in the bottom region of the hopper 4 registers with the open top of the melting chamber. The condition of the charge of molten glass in each of the four superimposed zones of the melting chamber may but need not be perceptibly different; as a rule, the transition in the condition of charge from zone to zone is sufficiently gradual to eliminate the likelihood of pronounced stratification. An apertured base plate or spinneret 3 which is clamped between the blocks 1c, 1d has a plurality of tubular nozzles 2 defining small orifices for extrusion of glass filaments 6 which are being withdrawn and further processed in a manner not forming part of this invention. It will be noted that the lowermost zone of the melting chamber (namely, the zone defined by the lowermost block 1d) is rather small and communicates directly with the upper ends of orifices in the nozzles 2. The nozzles 2 are disposed in two parallel rows whereby the nozzles of one row may but need not be staggered with respect to the nozzles of the other row, as considered at right angles to the plane of FIG. 1. The crucible 1 is elongated, again as considered at right angles to the plane of FIG. 1, so that it can comprise a relatively long spinneret 3. The side walls of the funnel 4 are elongated and diverge upwardly and away from the topmost zone 5 of the melting chamber. The zones defined by the median blocks 1b, 1c constitute a homogenzining area 7 wherein molten glass is heated to a temperature which suffices to avoid the formation of streaks which could clog the nozzles 2 or adversely influence the uniformity of filaments 6.

The means for heating the material in the melting chamber of the crucible 1 is a resistance heater whereby the charge of molten glass preferably constitutes the resistance.

That part of the apparatus which serves to transport particles 50 from a main magazine or source 8 for storage of a substantial supply of particles 50 to the hopper 4 above the topmost zone 5 of melting chamber in the crucible 1 comprises a composite trough including a first portion or upper trough 9 and a second portion or lower trough 10. The apparatus further comprises a weighing device 11 which is disposed between the discharge end of the trough 9 and the receiving end of the trough 10. The receiving end of the trough 9 is located below a discharge opening 19 in the bottom portion of the magazine 8, and the discharge end of the trough 10 is located above the open upper end of the hopper 4. Each of the particles 50 resembles a portion or tablet of a chocolate bar and includes normally one substantially square tablet 51 which single tablets are connected to each other by a narrow web 52 before they are severed by breaking for use. It is clear however, that the particles which are stored in the magazine 8 may have a hexagonal, rectangular, other polygonal, oval or a more complex shape. Glass particles resembling the particle shown in FIGS. 2 and 2a are also called "pellets" in spite of the fact that they do not have a spherical or substantially spherical shape, whereas particles of such shape are called "marbles."

The upper trough 9 comprises three discrete but rigidly connected sections 14, 15, 16 which can be moved by a first vibrator motor 12. The lower trough 10 comprises four sections 33, 34, 35, 36 which are rigidly connected to each other and can be moved by a second vibrator motor 13. The magazine 8 may but need not be vibrated. The purpose of the weighing device 11 is to receive a predetermined quantity (by weight) of particles 50 from the last section 16 of the trough 9 and to intermittently discharge the thus accumulated quantity of particles 50 into the first section 33 of the trough 10.

The upper side of the bottom region of the first section 14 of the upper trough 9 is inclined downwardly and rearwardly, i.e., away from the next-following section 15 and counter to the direction of desired transport of particles 50 which issue from the magazine 8. The median section 15 is horizontal or nearly horizontal, and the last section 16 of the trough 9 slopes downwardly in the direction of desired transport of particles 50 toward a receptacle 17 of the weighing device 11. A fixedly mounted or vibratable downwardly inclined chute 18 directs into the receptacle 17 those particles 50 which move beyond the front edge portion 20 of the section 16. The chute 18 may constitute an apertured plate, sieve or grate so as to permit small fragments of glass particles 50 as well as dust to pass through its interstices before such fragments and/or dust can reach the receptacle 17. This insures a more reliable homogenization of molten charge in the chamber of the crucible 1 because the hopper 4 invariably receives only particles 50 of predetermined size, weight and shape.

Due to the fact that the first section 14 of the upper trough 9 slopes rearwardly, i.e., away from the next-following sections 15 and 16, it invariably accumulates a certain number of particles 50 which must travel upwardly in response to starting of the motor 12 so as to advance toward the horizontal or nearly horizontal second section 15. The channels defined by the sections 14–16 of the trough 9 have a triangular outline (see FIG. 3) so that each such channel contains a stream or file of particles 50 which advance toward the chute 18. The particles 50 in the section 14 advance at a relatively slow rate because they must move upwardly so that they are rather closely adjacent to each other. The particles of the stream in the channel of the section 15 are accelerated because this section is horizontal or nearly horizontal (it may slope rearwardly but to a lesser extent than the section 14 or forwardly but to a lesser extent than the section 16). The particles 50 which descend into the channel of the section 16 undergo a further acceleration so that the attenuated stream in this channel consists of a single file of spaced apart particles 50. This is desirable in order to insure that the chute 18 and the receptacle 17 receive particles 50 at timely spaced intervals, i.e., not more than one particle at a time, even though the chute 18 may be long enough to support two or more spaced apart particles 50 at a time. Thus, the intervals at which the particles 50 of the stream advancing from the discharge opening 19 of the magazine 8 toward the chute 18 move over and beyond the front edge portion 15a of the second section 15 are shorter than the intervals at which successive particles 50 move over and descend beyond the front edge portion 16a of the last section 16. This will be readily appreciated since a particle 50 which descends onto the section 16 is immediately accelerated due to greater inclination of the channel in the section 16 so that the next-following particle 50 cannot catch up with the preceding particle; on the contrary, the distance between the two particles increases prior to acceleration of the next-following article on the section 16 to the speed of the preceding particle. It can be said that, at least during travel in the left-hand portion of the channel defined by the section 16, a preceding particle 50 invariably covers a greater distance per unit of time than the next-following particle which results in a highly desirable spreading or spacing-apart of particles of the stream of particles travelling from the discharge opening 19 toward the chute 18.

The weighing device 11 is of a type which can be adjusted to automatically open a pivotable gate 21 of its receptacle 17 when the latter accumulates a predetermined quantity of glass, i.e., when the weight of solid particulate material in the receptacle 17 equals or very closely approximates a predetermined value. Since the chute 18 delivers a single file of spaced-apart particles 50, the exact weight of particulate material in the receptacle 17 at the time the weighing device 11 causes the gate 21 to open can equal a predetermined weight which is a whole multiple of the weight of a single particle 50 or deviates from such whole multiple by less than the weight of a single particle. For example, and assuming that the gate 21 opens when the receptacle 17 contains one hundred particles 50 of identical weight, the gate 21 will open when the receptacle contains one hundred and one particle if one of the particles is lighter than a predetermined norm. Such exact calibration is possible and effective because the trough 9 supplies to the chute 18 a steam consisting of a single file of spaced-apart particles 50, i.e., because the receptacle 17 receives one particle at a time.

The exact construction of the mechanism in the weighing device 11 forms no part of the invention. It suffices to say that the device 11 opens a gate 21 (e.g., by energizing an electromagnet, not shown) when the combined weight of particulate material in the receptacle 17 equals or negligibly exceeds a predetermined value, and the weighing device 11 then also arrests the vibrator motor 12 to thereby insure that the trough 9 ceases to deliver particles 50 to the chute 18 while the contents of the receptacle 17 are being transferred into the first section 33 of the lower trough 10. The motor 12 is started in response to closing of the gate 21, or vice versa. The weighing device 11 insures that the first section 33 of the trough 10 receives a predetermined quantity (by weight) of particles 50 at regular or slightly irregular intervals. This enables the trough 10 to deliver to the hopper discrete particles 50 at identical intervals and to thus insure that the charge of molten glass in the chamber of the crucible 1 is homogeneous at all times, at least in the area 7 directly above the nozzles 2 of the spinneret 3.

The means for supporting the magazine 8 and troughs 9, 10 comprises a metallic frame which includes U-bars 23. The bars 23 support a traverse 24 which also consists of profiled metallic stock and includes flanges 26 having elongated slots 25 for fasteners which secure the traverse to the bars 23. The traverse 26 carries an elongated bracket 27 for the upper trough 9. The slots 25 enable the attendants to adjust the position of the trough 9 in such a way that the first section 14 is in an optimum position with respect to the discharge opening 19 and the chute 18 is in an optimum position with respect to the open upper side of the receptacle 17. In the embodiment of FIG. 1, the chute 18 is mounted on a carrier 18a which is secured to the last section 16 of the trough 9.

The sections 14, 15 of the trough 9 are respectively welded or otherwise rigidly secured to crossheads 29a, 29b which rest on elastic carriers 30a, 30b. Each of the carriers 30a, 30b may constitute an elastic cushion, a package of dished springs or other yieldable supporting means for the trough 9. The elastic carriers 30a, 30b include holders 31 which are welded to the side wall 28 of the bracket 27. The vibrator motor 12 is mounted on a bracket 32 which is welded to the section 14 and/or 15 of the trough 9.

The inclination of successive sections 33, 34, 35, 36 of the lower trough 10 increases progressively in a direction from the weighing device 11 toward the hopper 4. The pivoting of gate 21 to open position results in evacuation of the contents of the receptacle 17 onto an inclined chute 22 which causes the particulate material to descend into the channel of the first section 33. As mentioned above, the gate 21 opens as soon as the combined weight of particles 50 in the receptacle 17 equals or only slightly exceeds a preselected value so that the section 33 receives fixed quantities of particulate material at timely spaced intervals. Such material forms a stream whose particles are accelerated to a first extent during travel in the channel of the section 33, thereupon to a greater second extent during travel in the channel of the section 34, to a still greater extent during travel in the channel of the section 35, and to a maximum extent during travel in the channel of the last section 36 of the trough 10. Consequently, the particles 50 which advance from the section 33 toward the left-hand edge portion of the section 36 ultimately form a single file or attenuated stream of spaced-apart and normally equidistant particles which descend seriatim into the hopper 4 to thereupon enter the charge of molten glass in the chamber of the crucible 1. The inclination of the sections 33–36 need not be such as shown in FIG. 1, i.e., these sections may include at least one horizontal section or two or more sections of identical inclination; however, the construction of the trough 10 is preferably such that the particles 50 which travel in the channel of the last section 36 form a single file and are spaced apart to thus insure that the hopper 4 receives one particle at a time and not more than a relatively small number of particles at a time.

The sections 33–36 of the lower trough 10 are mounted on a supporting arm 38 which is pivotable about the axis of a vertical shaft 43 mounted in a bearing member or housing 44 secured to the aforementioned frame including the U-bars 23. The arm 38 further carries two plates 39, 40 for elastic carriers 41a, 41b corresponding to the aforementioned carriers 30a, 30b. The plates 39, 40 may be bolted, screwed or welded to the arm 38. The bearing member or housing 44 further supports the weighing device 11. The elastic carriers 41a, 41b are secured to cross-heads 42a, 42b which are respectively secured to the sections 35, 34 of the trough 10.

The motor 13 is mounted on a bracket 113 which is welded to the sections 33 and 35. The means for pivoting the arm 38 back and forth so that the discharge end of the channel in the section 36 moves substantially lengthwise of the hopper 4 comprises a pulley or sprocket wheel 45 which is secured to the upper end of the shaft 43 and is driven by a belt or chain, not shown, to pivot the arm 38 clockwise and anticlockwise through angles of preselected magnitude. The shaft 43 is assumed to be rigid with the arm 38 and to be rotatably journalled in the housing 44. The pivoting of arm 38 insures that the trough 10 discharges successive particles 50 into spaced-apart portions of the hopper 4, as considered at right angles to the plane of FIG. 1.

FIG. 3 shows the construction of one of the trough sections, e.g., the section 14. The section is drawn to actual size or close to actual size. The same applies for the particles 50 shown in FIGS. 2 and 2a. The bottom portion of the channel in the section 14 is defined by a V-bar 46 which is welded to a crosshead 47 corresponding to the member 29a shown in FIG. 1. One end portion of the V-bar 46 extends into the similarly configurated V-bar of the adjacent section 15 and is welded thereto. Analogously, the right-hand end portion of the V-bar of the section 15 is received in and welded to the left-hand end portion of the V-bar of the section 16. The crosshead 47 of FIG. 3 is connected to the elastic carrier 30a by bolts, screws, or analogous fastener means. The section 14 is assumed to receive and temporarily store a relatively large quantity of particles 50. Therefore, it preferably comprises extensions or side walls 48 of sheet metal which are welded to the upper edges of the V-bar 46. Similar extensions or side walls (shown at 37 in FIG. 1) can be welded to the V-bar of the first section 33 of the lower trough 10 because the section 33 receives a relatively large number of particles 50 when the weighing device 11 opens the gate 21.

It is further within the purview of the invention to construct each of the troughs 9, 10 (or at least one of these troughs) as a one-piece body which preferably consists of a metallic material and comprises a plurality of integral sections corresponding to the sections 14–16 or 33–36. For example, at least one of the troughs may be made of sheet metal with sections bent relative to each other to form channels of triangular or other suitable cross section and to be inclined relative to each other for the purpose of insuring that the discharge end of the trough releases one particle 50 at a time. The arrangement may be such that only the least section of the trough 9 or 10 is inclined downwardly, i.e., such inclined section should bring about an acceleration of particles 50 which advance toward the chute 18 or hopper 4.

If desired, the chute 22 may also constitute a sieve or grate to allow for segregation of dust and/or small fragments of glass particles which should not reach the hopper 4 and the melting chamber in the crucible 1. Dust and fragments of glass particles are likely to develop in the magazine 8, during introduction of particles 50 into the magazine, as well as during transport of particles from the discharge opening 19 into the receptacle 17 and/or during intermittent opening of the gate 21 to dump the contents of the receptacle 17 onto the chute 22.

The operation of the apparatus will be readily understood upon perusal of the preceding description. When the weighing device 11 opens the gate 21 of its receptacle 17 so that a metered quantity of particles 50 descends into the channel of the section 33, the trough 10 begins to advance the particles toward the crucible 1 and insures that the last section 36 discharges one particle at a time. At the same time, the pulley or sprocket wheel 45 causes the arm 38 to swing back and forth so that the section 36 discharges successive particles 50 into different portions of the hopper 4 and hence into different portions of melting chamber in the crucible. This further contributes to homogenization of molten charge in the chamber of the crucible 1 and thereby contributes to uniformity of filaments 6. The receptacle 17 accumulates a fresh supply of particles 50 not later than when the last particles of the preceding metered quantity leave the channel of the section 33 so that the trough 10 delivers a continuous stream of particles in order to maintain the surface of the charge in the crucible 1 at or very close to a predetermined level. Short interruptions in the stream of particles 50 which advance in the trough 10 toward the hopper 4 (for example, if the receptacle 17 fails to accumulate a requisite number of fresh particles 50 before the last particle of the preceding metered quantity leaves the section 33) have no bearing on the quality of filaments 6 because the mass of a particle 50, as compared with the capacity of the crucible 1 and the quantity of molten glass therein, is rather small. In face, such minor fluctuations in the length of intervals at which the gate 21 opens are often beneficial because this insures that the section 36 does not discharge particles 50 into identical portions of the hopper 4, i.e., that the distribution of particles 50 which form part of a first metered quantity and which have been introduced into the hopper 4 and thence into the melting chamber is not identical with the distribution of particles which form part of the next metered quantity.

The apparatus may further comprise means for monitoring the quantity of particles 50 in the funnel 4 and/or the upper surface of molten glass in the chamber of the crucible 1 for the purpose of arresting the motor 12 and/or 13 when the hopper 4 contains an excessive number of particles and/or when the level of molten glass in the crucible is too high. Such monitoring means may employ one or more level detectors, e.g., suitable photoelectric cells shown in FIG. 1. A first or upper cell includes a light source 61 in register with a photosensitive transducer 62. The light beam issuing from the source 61 impinges on the photosensitive surface of the transducer 62 until and unless the upper surface of molten glass in the crucible rises above a maximum permissible level. The signal from the transducer 62 is amplified and used to arrest the motor 12 and/or 13. A similar detector can be installed in or on the hopper 4 to monitor the quantity of particles 50 therein. It is clear that the portion of block 1b between the parts 61, 62 of the upper cell transmits light so that the beam issuing from the source 61 can reach the transducer 62 when the quantity of molten glass in the crucible is satisfactory. A second cell 63, 64 is installed at a level below the detector 61, 62 to again start the motor 12 and/or 13 when the upper surface of molten glass in the crucible 1 descends below a minimum permissible level.

The provision of monitoring means for particles 50 in the hopper 4 and/or for the upper surface of molten glass in the crucible 1 is particularly desirable in a simplified apparatus which employs a single trough and dispenses with the weighing device 11. For example, if the trough 9 is omitted, the discharge opening 19 of the magazine 8 can be located at a level above the section 33 of the trough 10 so that the sections 33–36 deliver particles 50 to the hopper 4 as long as the motor 13 is on. Such simplified apparatus can be used with advantage with the crucible is relatively small or when the apparatus must be mounted in a small area which does not suffice to accommodate a composite trough consisting of several troughs in addition to at least one weighing device. The monitoring means for the particles 50 in hopper 4 and/or for the upper surface of molten glass in the crucible can be said to constitute a substitute for the weighing device (if the weighing device is omitted). It will be readily appreciated that, in the absence of a weighing device, the rate of delivery of particles to the hopper 4 cannot be synchronized to the rate of extrusion of molten material via nozzles 2 with the same degree of accuracy as in the apparatus of FIG. 1. However, the level detector or detectors enable such simplified apparatus to maintain the quantity of molten glass in the crucible within a permissible range.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. Apparatus for making glass filaments, comprising a crucible having an elongated open-top chamber for a charge of molten glass and orifices through which molten glass is extruded to form filaments; a source of substantially identical discrete solid particles in the form of glass tablets or groups of interconnected glass tablets; and means for transporting a stream of particles from said source to a position above said chamber so that the particles descend into the charge by gravity, comprising at least one elongated trough having a succession of sections which define an elongated path for the stream of particles and include a last section located immediately ahead of said chamber and a further section preceding said last section, all of said sections being inclined downwardly toward said chamber and said last section being inclined more steeply than said further section, the inclination of said last section being such that the particles sliding therein are accelerated one after the other and enter the charge in said chamber at timely spaced intervals, means for vibrating said trough to thereby advance the particles toward and beyond said last section, and means for moving said least section lengthwise of said chamber.

2. Apparatus as defined in claim 1, further comprising an elongated hopper located above and registering with the open top of said chamber, said last section of said trough being arranged to discharge successive particles into said chamber through the medium of said hopper.

3. Apparatus as defined in claim 1, wherein said trough comprises a first portion having a receiving end in the region of said source and a discharge end, and a second portion having a discharge end defined by said last section and a receiving end, and further comprising a weighing device having a receptacle positioned to receive particles from the discharge end of said first portion and means for evacuating the contents of said receptacle into the receiving end of said second portion when the combined weight of particles in said receptacle equals or closely approximates a predetermined value.

4. Apparatus as defined in claim 3, wherein each portion of said trough comprises a plurality of sections which are inclined with respect to each other.

5. Apparatus as defined in claim 1, wherein said trough comprises a first section arranged to receive particles from said source and being downwardly inclined counter to the direction of transport of particles toward said last section.

6. Apparatus as defined in claim 1, wherein said transporting means comprises a plurality of troughs and means for vibrating said troughs independently of each other.

* * * * *